No. 788,296. PATENTED APR. 25, 1905.
H. S. WEST.
FISH HOOK.
APPLICATION FILED JUNE 9, 1904.
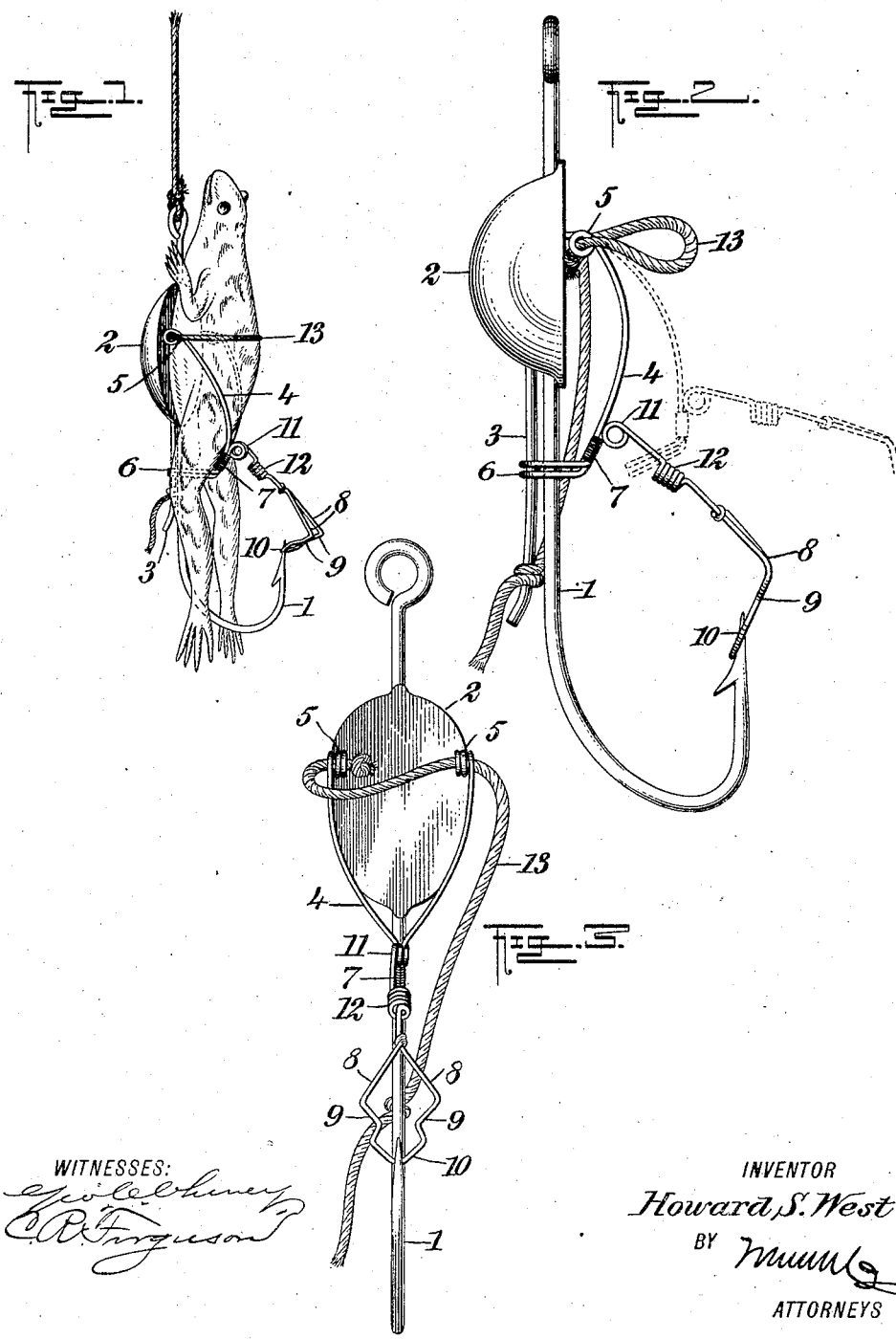
WITNESSES:
INVENTOR
Howard S. West
BY
ATTORNEYS No. 788,296.

Patented April 25, 1905.

UNITED STATES PATENT OFFICE.

HOWARD SYLVAN WEST, OF COUNCIL BLUFFS, IOWA.

FISH-HOOK.

SPECIFICATION forming part of Letters Patent No. 788,296, dated April 25, 1905.

Application filed June 9, 1904. Serial No. 211,813.

*To all whom it may concern:*

Be it known that I, HOWARD SYLVAN WEST, a citizen of the United States, and a resident of Council Bluffs, in the county of Pottawattamie and State of Iowa, have invented a new and Improved Fish-Hook, of which the following is a full, clear, and exact description.

This invention relates to improvements in fish-hooks, an object being to provide a hook with a novel and effectual weed-guard so sensitively formed as to readily yield for the hooking of a fish, but not liable to be detached from the hook-point by lateral or direct pressure when drawn through weeds or grass in the water.

Another object of the invention is to provide a simple form of harness for securing bait, such as frogs or minnows, on the hook so that the bait cannot be detached by a fish.

I will describe a fish-hook embodying my invention and then point out the novel features in the appended claims.

Reference is to be had to the accompanying drawings, forming a part of this specification, in which similar characters of reference indicate corresponding parts in all the figures.

Figure 1 is a perspective view of a fish-hook embodying my invention, showing a bait in place. Fig. 2 is a side view of the hook, and Fig. 3 is a plan view.

Referring to the drawings, 1 designates the hook, on the shank of which, as here indicated, near the eye, is a sinker 2, and also attached to the sinker and extended along the shank of the hook is a wire 3, which forms a spring-clip for holding a portion of the harness, as will be hereinafter described.

The harness has a wire formed into a loop 4, which from the end toward the point of the hook diverges, and the ends are secured to the sinker 2. The loop is bowed outward slightly with relation to the shank of the hook, and members of the bow adjacent to the connection with the sinker are coiled to form springs 5. The meeting portion of the wire forming the loop 4 is turned inward to form a hook 6 for removably engaging around the shank of the hook or, as here shown, around the spring-clip 3. Then the wire is carried outward and secured by a winding 7, and then the wire is continued outward to form the weed-guard. To form the weed-guard, the wire is bent to provide a loop portion consisting of divergent members 8, which are inclined laterally of the hook-point, so as to effectually deflect weeds or grass, and from the divergent portions 8 the wire has convergent points 9, which are turned downward toward the hook-point and terminate in a small loop 10 for engaging underneath the point of the hook or between the point and the barb. The parts 9 10 not only turn downward toward the point of the hook, but they are slightly inclined toward the barb.

Arranged between the point-engaging loop and the connection with the loop 4 the guard is provided with two spring-coils 11 12, arranged at right angles to each other, thus providing practically a universal joint, or, in other words, permitting a practically universal movement and rendering the guard unbreakable by lateral or other pressure while being drawn through the water and weeds.

Another feature of the harness consists of a cord or other flexible material 13. One end of this cord 13 is passed through one of the coils 5 and knotted at the inner side. Then the cord is passed through the other coil 5, and when engaged over the back of the bait, as indicated in Fig. 1, the cord is drawn downward and turned once or twice around the spring-clip 3, which will crowd the cord against the shank of the hook, thus providing an effectual fastening. Before placing the bait in position the hook 6 is to be released in order that the loop 4 may spring outward and the frog or other bait passed between members thereof, after which the hook 6 is to be again engaged with the part 3, as indicated in Fig. 2.

Further, in relation to the angle of the loop it may be stated that the loop is so formed that it is an efficient weed-guard either under the point, as designed to be used, or extending out beyond the point. Its wedge shape makes it impossible to trip or catch in any way that would interfere with hooking the fish. The locking-angles on each side of the loop are one of its leading features. It is so shaped that slight lateral pressure carries the point of the hook into the angle of the loop, making a positive locking device that prevents it from being thrown out of position in drawing through weeds. Slight downward or lateral pressure directly over the loop, as it would occur in fish-striking, will easily release the guard, owing to the flexibility of the middle spiral coil.

Having thus described my invention, I claim as new and desire to secure by Letters Patent—

1. A fish-hook and a weed-guard, consisting of wire supported on the hook-shank and provided with a loop for engaging under the hook-point, and spring-coils formed in the wire at right angles to each other between the loop and shank.

2. A fish-hook and a weed-guard therefor, comprising wire supported on the hook and provided with spring-coils arranged at right angles to each other between its ends, and a loop on the outer end of the guard having divergent members terminating in convergent members which are turned inward toward the shank of the hook and terminate in a small loop for engaging underneath the hook-point.

3. A fish-hook, a sinker secured to the shank thereof, a wire having a loop portion, the ends of which are provided with spring-coils and extended into the sinker, the meeting ends of the loop members being turned to form a shank-engaging member, a wire then being carried outward and formed into coils, and terminating in a loop for engaging with the hook-point.

4. A hook, a sinker secured to the shank thereof, a spring-wire extended from the sinker along the shank of the hook, a wire bent to form a loop member having coiled portions, the ends of the loop being secured in the sinker, the meeting ends of the loop being turned to form a shank-engaging member, a wire then being carried outward and provided with two spring-coils at right angles to each other, the said wire terminating in a loop for engaging with the hook-point, and a cord or other flexible device passing through the first-named spring-coils and adapted to engage with said spring-clip.

5. The combination with a fish-hook, of wire formed with a loop portion having its ends supported on the hook-shank, a weed-guard portion extended from the loop, and means for detachably engaging the front end of the loop with the hook-shank.

In testimony whereof I have signed my name to this specification in the presence of two subscribing witnesses.

HOWARD SYLVAN WEST.

Witnesses:
ADOLPH. F. BENO,
L. C. BRACKETT.